(12) United States Patent
Horman et al.

(10) Patent No.: US 6,946,083 B2
(45) Date of Patent: Sep. 20, 2005

(54) DUST-REDUCING COMPOSITIONS FOR TREATING DRY SOIL

(75) Inventors: Ian Horman, Blonay (CH); Pierre Hirsbrunner, Corseau (CH); Franz Kohler, Bogève (FR)

(73) Assignee: Jacques Vionnet, Begnins (CH)

( * ) Notice: Subject to any disclaimer, the term of this patent is extended or adjusted under 35 U.S.C. 154(b) by 0 days.

(21) Appl. No.: 10/455,456

(22) Filed: Jun. 4, 2003

(65) Prior Publication Data

US 2004/0245494 A1 Dec. 9, 2004

(51) Int. Cl.⁷ .................................................. C09K 3/22
(52) U.S. Cl. ...................................... 252/88; 252/88.1
(58) Field of Search .................................. 252/88, 88.1

(56) References Cited

U.S. PATENT DOCUMENTS 4,001,033 A * 1/1977 Anthone et al. ....... 106/287.23
5,415,795 A * 5/1995 Roe et al. .................... 427/212
5,595,782 A * 1/1997 Cole ............................ 427/212

* cited by examiner

*Primary Examiner*—Necholus Ogden
*Assistant Examiner*—D. G. Hamlin
(74) *Attorney, Agent, or Firm*—Winston & Strawn LLP

(57) ABSTRACT

A dust-reducing composition for treating dry soil that includes a hygroscopic compound together with a hydrophobic compound in relative amounts sufficient to form a water-repellant surface on the soil. Also, a process for treating dry soil to reduce dust generation due to movement of traffic or air thereover. This process includes applying onto the soil a hygroscopic compound and subsequently applying a hydrophobic compound onto the hygroscopic compound containing soil. Alternatively, the process includes applying onto the soil an aqueous solution of a mixture of a hygroscopic compound and a hydrophobic compound. In either case, the hygroscopic and hydrophobic compounds are applied in relative amounts sufficient to form a water-repellant surface on the soil.

19 Claims, No Drawings

DUST-REDUCING COMPOSITIONS FOR TREATING DRY SOIL

BACKGROUND ART

The present invention relates to a composition and a method for reducing the generation of dust from dry soil. The invention is specifically intended to be used on dirt roads to reduce the generation of dust clouds as traffic or air moves over such roads.

In farming areas, many roads or paths are covered, particularly in dry weather, with dust or other earth particles of small dimensions, and these particles develop large dust clouds as the result of movement of vehicular traffic, like cars or trucks, or by the wind. There are very many drawbacks associated with this problem, as the movement of dust can affect public health and the hygiene of crops, as well as cause premature wearing of machine parts and traffic hazards. To counteract this problem, a daily spraying treatment with water is used, and this requires huge volumes of water, a significant amount of labor and the use of expensive devices. This is a very old problem and in our industrial time, several proposals have been already made. Of course, the simplest solution is to pave the roads with asphalt or concrete, but this is an expensive solution and not desirable for farms or other rural locations. A more accepted solution is the topical treatment of the road with hygroscopic compounds, such as molasses, alkaline earths salts and similar components. The problem with this treatment is that rainfall causes dissolution of the hygroscopic compounds and the dissolved components penetrate into the soil with the related risks of loss of efficacy as well as pollution. There is therefore a need to find a solution to solve this problem which is particularly critical on large farms or in countries or regions that have hot, dry climates.

SUMMARY OF THE INVENTION

The present invention relates to a dust-reducing composition for treating dry soil. This composition comprises a hygroscopic compound together with a hydrophobic compound in relative amounts sufficient to form a water-repellant surface on the soil.

The invention also relates to a process for treating dry soil to reduce dust generation due to movement of traffic or air thereover. This process comprises applying onto the soil a hygroscopic compound and subsequently applying a hydrophobic compound onto the hygroscopic compound containing soil. Alternatively, the process comprises applying onto the soil an aqueous solution of a mixture of a hygroscopic compound and a hydrophobic compound. In either case, the hygroscopic and hydrophobic compounds are applied in relative amounts sufficient to form a water-repellant surface on the soil.

Preferably, the hygroscopic and hydrophobic compounds are each applied to the soil in the form of an aqueous solution. The soil to be treated is typically in a dry state and comprises sand, clay, loess, loam or mixtures thereof.

DETAILED DESCRIPTION OF THE INVENTION

The present invention specifically relates to a composition for avoiding the formation of clouds of dust on dry roads or paths made of earth or dirt or covered with small earth particles. The soil to be treated with the composition of the present invention is generally in a dry state, i.e., one that contains less that 5% water. Typically, the soil may be or include sand, clay, loess, loam or mixtures thereof.

The composition generally comprises a hygroscopic compound together with a hydrophobic compound in water. The solution enables the hygroscopic compound and hydrophobic compound to combine to render the surface water repellant.

Advantageously, the hygroscopic compound is selected from the group consisting of alkaline earth chlorides and molasses. The alkaline earths are preferably calcium or magnesium. The hygroscopic compound is preferably an organic product such as beet molasses, sugar cane or the like.

The hydrophobic compound is preferably selected from the group consisting of alkali metal C1 to C4 alkyl siliconates, alkali metal silicates and mixtures thereof. The alkali metal that forms the silicate and alkyl siliconate salt is preferably sodium or potassium. The alkyl siliconate is preferably methylsiliconate. The silicate compound is preferably a sodium or potassium hydrosoluble silicate. In the case of the use of both silicate and siliconate, they are present in a molar ratio of about 1:1 to 5:1. The most preferred silicate compounds are sodium or potassium ortho- or meta-silicate.

In the composition according to the invention, the amount of hydrophobic compound is between 0.5 and 5% by weight based on the amount of the hygroscopic compound. This means that the main amount of the product in the composition, besides the water, is the hygroscopic compound. It is therefore preferred for this compound to be the cheapest alternative possible so as to minimize the cost of the composition. Beet molasses is an inexpensive product material and will be preferably used according to the invention. The amount of the hygroscopic compound is preferably between 10 and 35% by weight ,of the final composition. The amount of water in the composition is generally between 50 and 90% by weight.

According to the process of the invention, two applications are possible. According to a first embodiment, the process comprises first applying on the soil an aqueous solution of the hygroscopic compound and subsequently applying an aqueous solution of the hydrophobic compound. According to a second, more preferred embodiment, the process comprises applying on the soil an aqueous solution of both the hygroscopic compound together with the hydrophobic compound.

In a preferred embodiment of the process of the invention, the applied composition contains 2 to 10% by weight of the mixture of hygroscopic and the hydrophobic compounds. This composition is applied on the soil in the quantity of 0.1 to 4 liters per m2 of the soil.

EXAMPLES

In the following examples, the potassium methylsiliconate solutions used have a dry matter content of 48%, which represents a density of 1.34.

Example 1

Efficiency of molasses on dust

A particularly dusty reference soil (from Fresno, California, UC Davis West Farm) has been crushed with a standardized process after drying. The standard dust test P has a rating of 10. The reference value of 10 indicates that the soil generates large clouds of dust. By the addition of a growing quantity of industrial molasses, the rating changes as shown below in the following Table I, where zero means no dust development. The molasses used in these tests has a dry matter content of 85%.

TABLE I

| Dust Test P | Rating |
| --- | --- |
| Reference without treatment | 10 |
| 1% molasses | 8 |
| 2% molasses | 3–4 |
| 5% molasses | 1 |
| 10% molasses | 0 |
| wet soil | 0 |

The percentage of molasses means 1 volume of beet molasses for 100 vol of soil (1% v/v).

The treatment with 2 to 5% molasses makes an efficient contribution to the dust problem.

The following examples give the resistance of this treatment against washing or wetting.

Example 2

A dry mud surface (country road) slightly inclined is treated with 4 liter/m2 of a 10% molasses solution (10% dry matter, 90% water) by regular topical spraying. A second part of the road surface is treated with the same molasses solution, wherein 40 ml of the above mentioned solution of potassium siliconate is added.

After drying and interaction with the soil, the two following resistance tests have been carried out: Dust test: flow of air with a hair dryer at 1200 W at a distance of 1 m from the soil, Resistance test to washing: spraying 2 liters/m2 of water 5 times at a distance of 1 m with a watering can. The following results have been observed and are presented in Table II:

TABLE II

| Surface sample | Dust test P | Resistance to washing |
| --- | --- | --- |
| Reference | Huge dust development | Removal of the surface material |
| Treatment with 10% molasses alone as per Example 1 | No dust observed | Removal of the surface material and of molasses |
| Treatment according to Example 2 | No dust observed | Water flows off with no removal of surface material nor of molasses |

Example 3

On the same surface as in Example 2, a solution of molasses as described in that example has been sprayed regularly at a quantity of 4 liters/m2. After penetration and partial drying, the surface is treated with one liter/m2 of potassium methylsiliconate in 3 different solutions. The surface is treated with a 0.5, 1, and 2% solution, which means 5 ml, 10 ml and 20 ml of the active compound per m2 (Treatment 1, 2 and 3). This spraying is regular with a fan dispersion nozzle of TEE JET.

After drying and spontaneous chemical anchoring of methylsiliconate on the floor, the resistance tests described in this Example 2 have been carried out. The results are listed as follows in Table III.

TABLE III

| Surface sample | Dust test P | Resistance to washing |
| --- | --- | --- |
| Reference | Huge dust development | Removal of the surface material |
| Treatment 1 | No dust | Partial removal of surface material and molasses |
| Treatment 2 | No dust | Water flows off with no removal of surface material nor of molasses |
| Treatment 3 | No dust | Water flows off with no removal of surface material nor of molasses |

Example 4

A mud earth road, of 2.5 m wide, known to be very dusty when traveled upon by vehicles, is sprayed on a 40 m length with an amount of 3 liters/m2 of a 15% solution of beet molasses containing 1% of a potassium methylsiliconate solution. After penetration, a surface hydrophobing treatment is carried out by applying at high pressure with a fan dispersion nozzle of TEE JET a 5% solution of potassium methylsiliconate at an amount of 0.4 liter/m2. After drying and anchoring of the agent, the surface is perfectly hydrophobic. After restoring normal traffic, the anti-dust and resistance to washing properties are maintained for a long period, of at least 10 rain/dryness cycles. A particular care has been taken to ensure the correct run-off or rain water from the treated surface.

According to the present example, the treatment for 100 m2—that is 40 m of the road used —needs 45 liters of molasses, 3 liters of potassium methylsiliconate in the molasses solution and furthermore 2 liters methylsiliconate in the subsequent topical application (100 liters at 2%).

What is claimed is:

1. A dust-reducing composition for treating dry soil comprising a hygroscopic compound together with a hydrophobic compound in relative amounts sufficient to form a water-repellant surface on the soil, wherein the hydrophobic compound is an alkali C1 to C4 alkyl siliconate or a mixture of an alkali metal C1 to C4 alkyl siliconate and an alkali metal silicate.

2. The composition of claim 1, wherein the hygroscopic compound is an alkaline earth chloride or molasses.

3. The composition of claim 1, wherein the hygroscopic compound is calcium chloride or magnesium chloride.

4. The composition of claim 1 wherein the mixture of an alkali metal C1 to C4 alkyl siliconate and an alkali metal silicate is present in a molar ratio of about 1:1 to 5:1.

5. The composition of claim 1, wherein the amount of the hydrophobic compound is between 0.5 and 5% by weight based on the weight of the hygroscopic compound.

6. The composition of claim 1, wherein the hygroscopic compound is present in the amount of between about 10 and 35% by weight of the composition.

7. The composition of claim 1, which includes water in the amount of between 50 and 90% by weight.

8. The composition of claim 1 wherein the hygroscopic compound is an alkaline earth chloride or molasses and is present in an amount of between about 10 and 35% by weight of the composition, the hydrophobic compound is present in an amount of between 0.5 and 5% by weight based on the weight of the hygroscopic compound, and the composition further includes water in the amount of between 50 and 90% by weight.

9. A process for treating dry soil to reduce dust generation due to movement of traffic or air thereover, which comprises applying onto the soil a hygroscopic compound and subsequently applying a hydrophobic compound onto the hygroscopic compound containing soil, wherein the hygroscopic and hydrophobic compounds are applied in relative amounts sufficient to form a water-repellant surface on the soil and wherein the hydrophobic compound is an alkali metal C1 to C4 alkyl siliconate or a mixture of an alkali metal C1 to C4 alkyl siliconate and an alkali metal silicate.

10. The process of claim 9, wherein the hygroscopic and hydrophobic compounds are each applied to the soil in the form of an aqueous solution.

11. The process of claim 10, wherein each solution contains about 2 to 10% by weight of the compound to be applied.

12. The process of claim 9, wherein the amount of hydrophobic compound applied to the soil is between 0.5 to 5% by weight based on the amount of the hygroscopic compound that is applied.

13. The process of claim 9, wherein the soil to be treated is a dry state and comprises sand, clay, loess, loam or mixtures thereof.

14. A process for treating dry soil to reduce dust generation due to movement of traffic or air thereover, which comprises applying onto the soil an aqueous solution of a mixture of a hygroscopic compound and a hydrophobic compound, wherein the hygroscopic and hydrophobic compounds are applied in relative amounts sufficient to form a water-repellant surface on the soil and the hydrophobic compound is an alkali metal C1 to C4 alkyl siliconate or a mixture of an alkali metal C1 to C4 alkyl siliconate and an alkali metal silicate.

15. The process of claim 14, wherein the hygroscopic and hydrophobic compounds are applied to the soil in an aqueous solution.

16. The process of claim 15, wherein the aqueous solution contains about 2 to 10% by weight of each of the hygroscopic and hydrophobic compounds.

17. The process of claim 15, which comprises applying 0.1 to 4 liters of the aqueous solution per $m^2$ of the soil.

18. The process of claim 14, wherein the soil to be treated is a dry state and comprises sand, clay, loess, loam or mixtures thereof.

19. A process for treating dry soil to reduce dust generation due to movement of traffic or air thereover, which comprises applying onto the soil the composition of claim 8.

* * * * *

UNITED STATES PATENT AND TRADEMARK OFFICE
CERTIFICATE OF CORRECTION

PATENT NO. : 6,946,083 B2 Page 1 of 1
DATED : September 20, 2005
INVENTOR(S) : Horman et al.

It is certified that error appears in the above-identified patent and that said Letters Patent is hereby corrected as shown below:

Column 4,
Line 44, after "compound is an alkali", insert -- metal --.
Line 58, after "compound is present in", delete "the" and insert -- an --.
Line 61, before "amount of between 50 and 90% by weight", delete "the" and insert -- an --.

Column 5,
Line 1, after "position further includes water in", delete "the" and insert -- an --.
Line 20, after "hydrophobic compound applied to the soil is between 0.5", delete "to" and insert -- and --.

Signed and Sealed this

Twenty-second Day of November, 2005

JON W. DUDAS
*Director of the United States Patent and Trademark Office*